(12) United States Patent
Sue et al.

(10) Patent No.: US 10,996,485 B2
(45) Date of Patent: May 4, 2021

(54) LASER POINTER WITH SHAKE CORRECTION MECHANISM AND METHOD FOR SUPPRESSING AND CONTROLLING VIBRATION

(71) Applicant: NIDEC SANKYO CORPORATION, Nagano (JP)

(72) Inventors: Takeshi Sue, Nagano (JP); Masato Gomyo, Nagano (JP); Ryoji Komatsu, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 107 days.

(21) Appl. No.: 16/285,342

(22) Filed: Feb. 26, 2019

(65) Prior Publication Data

US 2019/0265501 A1   Aug. 29, 2019

(30) Foreign Application Priority Data

Feb. 27, 2018 (JP) .............................. JP2018-033357

(51) Int. Cl.
 *G02B 27/64* (2006.01)
 *G02B 27/20* (2006.01)

(52) U.S. Cl.
 CPC ........... *G02B 27/646* (2013.01); *G02B 27/20* (2013.01)

(58) Field of Classification Search
 USPC .......................................................... 396/55
 See application file for complete search history.

(56) References Cited

U.S. PATENT DOCUMENTS

| | | | | |
|---|---|---|---|---|
| 7,312,863 | B2 * | 12/2007 | Feinsod ............... | G02B 27/646 250/201.1 |
| 7,380,722 | B2 * | 6/2008 | Harley .................. | G02B 27/20 235/462.2 |
| 7,553,048 | B2 * | 6/2009 | Wilson ................ | H01S 5/02292 362/259 |
| 7,728,964 | B2 * | 6/2010 | Feinsod ............... | G02B 27/646 356/149 |
| 7,762,684 | B2 * | 7/2010 | Wilson .................. | G02B 27/20 362/259 |

(Continued)

FOREIGN PATENT DOCUMENTS

| | | |
|---|---|---|
| JP | 07027999 A | 1/1995 |
| JP | 2011221341 A | 11/2011 |

*Primary Examiner* — Rodney E Fuller
(74) *Attorney, Agent, or Firm* — Cantor Colburn LLP

(57) ABSTRACT

A laser pointer may include a laser light emitter that emits a laser beam, a housing accommodating the laser light emitter; a vibration detection sensor that detects a vibration produced in the housing, a shake correction mechanism that changes a direction of the laser beam emitted by the laser light emitter, and a controller that controls the direction of the laser beam, which is changed by the shake correction mechanism, into a direction so as to offset the vibration detected by the vibration detection sensor. The controller may be configured to calculate a frequency of the vibration; calculate a movement amount of the vibration; determine whether a vibration applied to the housing is caused by a hand-shake based on the frequency of the vibration and the movement amount of the vibration; and activate the shake correction mechanism in response to a determination that the vibration is caused by a hand-shake.

2 Claims, 8 Drawing Sheets

(56) References Cited

U.S. PATENT DOCUMENTS

| | | | |
|---|---|---|---|
| 8,159,501 B2* | 4/2012 | Rao | G06F 3/0481 |
| | | | 345/593 |
| 8,682,151 B2* | 3/2014 | Minamisawa | G03B 5/00 |
| | | | 396/55 |
| 8,919,965 B2* | 12/2014 | Bowen | H04N 9/3173 |
| | | | 353/70 |
| 9,360,680 B1* | 6/2016 | Syrgabaev | G02B 17/08 |
| 9,581,315 B2* | 2/2017 | Cheung | F21V 15/01 |
| 2004/0151218 A1* | 8/2004 | Branzoi | G06F 3/0386 |
| | | | 372/25 |
| 2005/0128749 A1* | 6/2005 | Wilson | G02B 27/20 |
| | | | 362/259 |
| 2012/0140326 A1* | 6/2012 | Takeda | G02B 27/646 |
| | | | 359/554 |
| 2014/0286041 A1* | 9/2014 | Kim | F21V 21/30 |
| | | | 362/581 |

\* cited by examiner

LASER POINTER WITH SHAKE CORRECTION MECHANISM AND METHOD FOR SUPPRESSING AND CONTROLLING VIBRATION

CROSS REFERENCE TO RELATED APPLICATION

The present application claims priority under 35 U.S.C. § 119 to Japanese Application No. 2018-033357 filed Feb. 27, 2018, the entire content of which is incorporated herein by reference.

BACKGROUND

At least an embodiment of the present invention relates to a laser pointer with a shake correction mechanism having a function of suppressing a vibration caused by a hand-shake on a laser beam emitted by a laser light emitter, and a vibration suppressing and controlling method for suppressing and controlling a vibration.

A related art laser pointer with a shake correction mechanism is disclosed in, for example, Japanese Unexamined Patent Application Publication No. 7-27999. The laser pointer includes a light direction changing portion that receives light from a laser light emitting portion and emits after changing an optical axis in a Z axis direction into an X axis direction and a Y axis direction. The rotational angular velocity $d\theta x$ in the X axis direction and $d\theta y$ in the Y axis direction are detected by a rate sensor. Then, the rotational angular velocities $d\theta x$ and $d\theta y$ are integrated by using an integrator, and rotational angle signals $\theta x$ in the X axis direction and $\theta y$ in the Y axis direction are output. A motion of which frequency of a vibration of the laser pointer is relatively high is an unintentional vibration, and a motion of which frequency of the vibration is significantly low is an intentional point change. Therefore, a controller inputs rotation angle signals $\theta x$ and $\theta y$ of which low-frequency components are cut by using a high-pass filter, and a direction of light is changed by an angle of $-\theta x$ in the X axis direction and an angle of $-\theta y$ in the Y axis direction.

Another related art laser pointer is disclosed in Japanese Unexamined Patent Application Publication No. 2011-221341. This laser pointer includes: an actuator as a vibration suppressing mechanism that corrects blur by moving a light source or at least a part of a projection optical system with respect to a housing; and a controller that controls movement of the actuator based on a signal output from an angle sensor. The controller includes a filter portion through which only signals of specified frequency bands among signals output from an angular velocity sensor are passed. The filter portion removes, among the signals output from the angular velocity sensor, signals of a specific frequency component with determination that a person who supports the laser pointer is intentionally moving the laser pointer relatively slowly, and the filter portion causes a hand-shake correction not to activate.

In any of the related art laser pointers disclosed in Japanese Unexamined Patent Application Publication No. 7-27999 and Japanese Unexamined Patent Application Publication No. 2011-221341, among the vibrations applied to the laser pointer, a vibration of a specific frequency of the vibration is determined as a vibration caused by an intentional change in a pointing point of the laser pointer, and the vibration of this specific frequency of the vibration is removed by using a filter to perform a hand-shake correction. However, not all the vibrations of a specific frequency of the vibration are caused by an intentional change in a pointing point of the laser pointer, and a hand-shake correction in the related-art laser pointer cannot sufficiently remove vibrations caused by a hand-shake.

SUMMARY

At least an embodiment of the present invention provides a laser pointer with a shake correction mechanism which includes a laser light emitter that emits a laser beam, a housing accommodating the laser light emitter; a vibration detection sensor that detects a vibration produced in the housing, a shake correction mechanism that changes a direction of the laser beam emitted by the laser light emitter, and a controller that controls the direction of the laser beam, which is changed by the shake correction mechanism, into a direction so as to offset the vibration detected by the vibration detection sensor, wherein the controller includes: a frequency-of-vibration calculation unit that calculates a frequency of the vibration detected by the vibration detection sensor; a movement-amount-of-vibration calculation unit that calculates a movement amount of the vibration detected by the vibration detection sensor; a hand-shake determination unit that determines a vibration applied to the housing caused by a hand-shake based on the frequency of the vibration calculated by the frequency-of-vibration calculation unit and the movement amount of the vibration calculated by the movement-amount-of-vibration calculation unit; and a shake correction mechanism driving unit that activates the shake correction mechanism when the hand-shake determination unit determines that the vibration detected by the vibration detection sensor is caused by a hand-shake.

Further, a method for suppressing and controlling a vibration of a laser pointer with a shake correction mechanism, the method including: detecting, by a vibration detection sensor, a vibration produced in a housing accommodating a laser light emitter that emits a laser beam; and controlling, by a shake correction mechanism, a direction of the laser beam emitted by the laser light emitter into a direction so as to offset the vibration detected in the detection, wherein the controlling includes calculating a frequency of vibration and a movement amount of a vibration detected by the vibration detection sensor, determining whether the vibration applied to the housing is caused by a shake based on a frequency of a vibration and a movement amount of the vibration calculated in the calculating, and driving to activate the shake correction mechanism when it is determined in the determining that the vibration detected by the vibration detection sensor is caused by a hand-shake.

According to these configurations, it is determined, based on a frequency of a vibration and a movement amount of the vibration, whether the vibration produced in a housing accommodating a laser light emitter to be detected by a vibration detection sensor is caused by a hand-shake. When it is determined that the vibration is caused by a hand-shake, a shake correction mechanism is activated and a hand-shake correction is performed. Therefore, it is determined whether a vibration produced in the housing accommodating the laser light emitter is caused by a hand-shake by referring to the movement amount of the vibration in addition to the frequency of the vibration. For this reason, regarding vibrations of a specific frequency of a vibration, it is determined that those with a large movement amount of the vibration are vibrations caused by an intentional change in pointing point, and those with a small movement amount of the vibration are vibrations caused by trembling of the hand of the person holding the laser pointer. Therefore, vibrations caused by a hand-shake can be appropriately removed.

In at least an embodiment of the present invention, the hand-shake determination unit includes: a frequency comparison unit that compares the frequency of the vibration calculated by the frequency-of-vibration calculation unit with a reference frequency; a movement amount comparison unit that compares a movement amount of the vibration calculated by the movement-amount-of-vibration calculation unit with a reference movement amount; and a determining unit that determines that the vibration detected by the vibration detection sensor is caused by a hand-shake when the frequency of the vibration calculated by the frequency-of-vibration calculation unit is higher than the reference frequency and the movement amount of the vibration calculated by the movement-amount-of-vibration calculation unit is smaller than the reference movement amount.

In at least an embodiment of the present invention, the determining includes: comparing a frequency of a vibration calculated in the calculating with a reference frequency and comparing a movement amount of vibration with a reference movement amount; and when a comparison result is that the frequency of the vibration is higher than the reference frequency and that the movement amount of the vibration is smaller than the reference movement amount in the comparing, identifying to determine that the vibration detected by the vibration detection sensor is caused by a hand-shake.

According to these configurations, when the comparison result is that the frequency of the vibration produced in the housing accommodating the laser light emitter detected by the vibration detection sensor is higher than the reference frequency and the movement amount of the vibration is smaller than the reference movement amount, it is determined that the vibration detected by the vibration detection sensor is caused by a hand-shake. Therefore, a simple comparison between the frequency of the vibration and the reference frequency can determine whether the frequency of the vibration is high or low, and a simple comparison between the movement amount of the vibration with the reference movement amount can determine whether the movement amount of the vibration is large or small. Therefore, a hand-shake determination unit in the laser pointer with a shake correction mechanism is simpler in structure than in the related art structures provided with a filter, and a determination step in the method for suppressing and controlling the laser pointer can be performed simply and promptly.

At least an embodiment of the present invention includes a reference value setting unit that sets a value of the reference frequency and a value of the reference movement amount to respective values.

At least an embodiment of the present invention includes, before the comparing, inputting a value of the reference frequency and a value of the reference movement amount to be set to a reference value setting unit.

According to these configurations, the reference values for determining high or low of the frequency of the vibration and large or small of the movement amount of the vibration are appropriately adjusted in accordance with the personality of a person holding the laser pointer. Therefore, a laser pointer with a shake correction mechanism in accordance with the personality of a person holding the laser pointer, and a method for suppressing and controlling a vibration of the laser pointer are provided.

According to at least an embodiment of the present invention, a laser pointer with a shake correction mechanism capable of appropriately removing a vibration caused by a hand-shake and a method for suppressing and controlling a vibration of the laser pointer are provided.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Next, a laser pointer with a shake correction mechanism and a method for suppressing and controlling a vibration thereof according to at least an embodiment of the present invention will be described.

Entire Configuration

Figure 1:
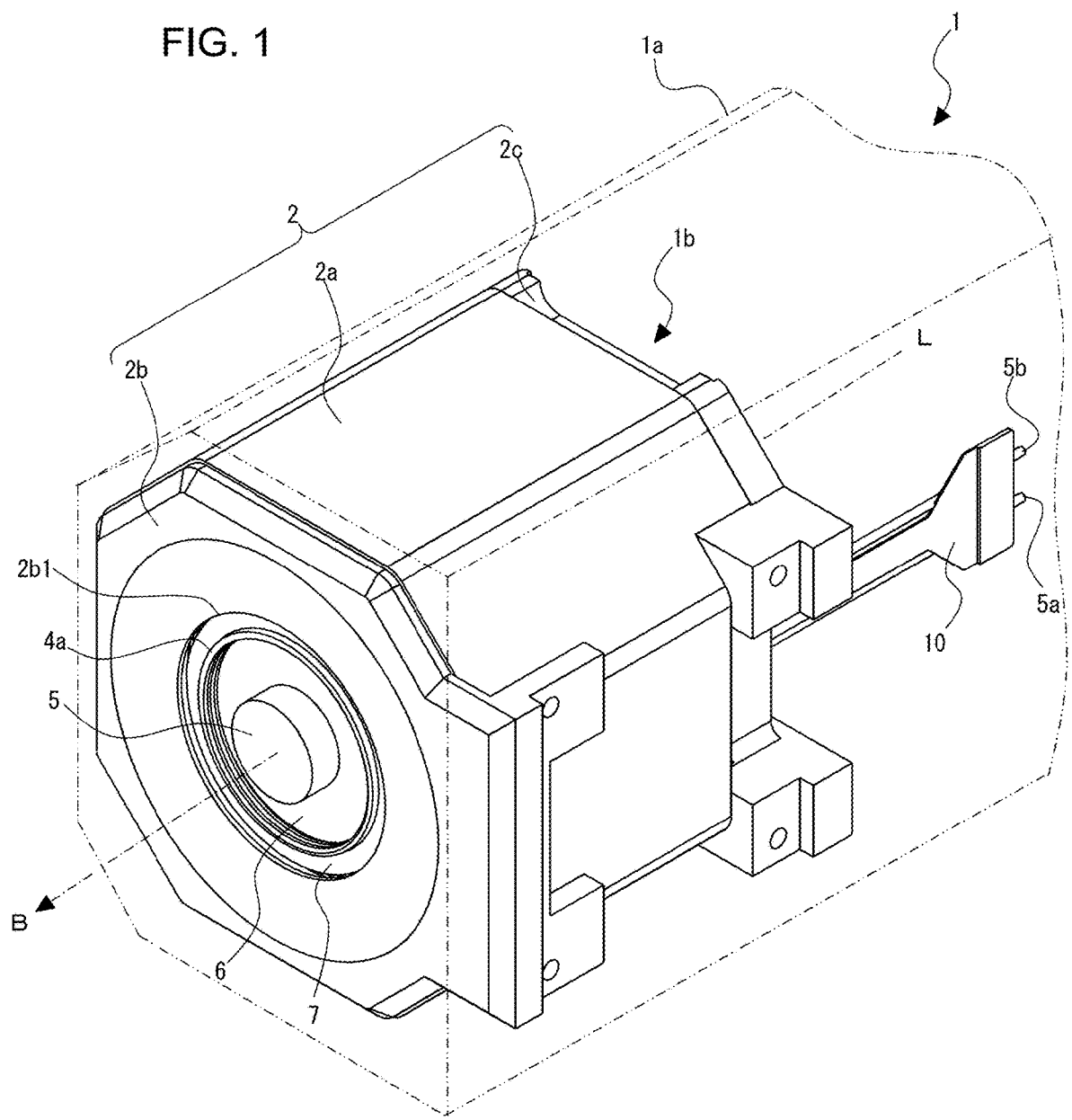
FIG. 1 is an external perspective view of a laser pointer with a shake correction mechanism according to an embodiment of the present invention.
Figure 1:
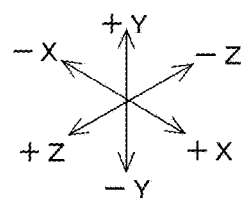
Figure 2A:
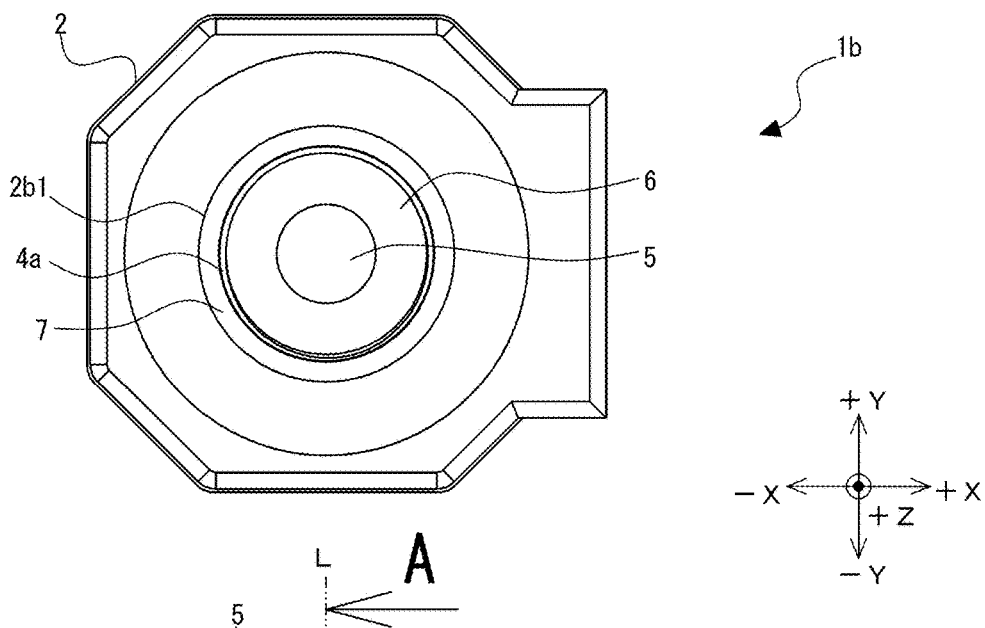
FIG. 2A is a front view.
Figure 2B:
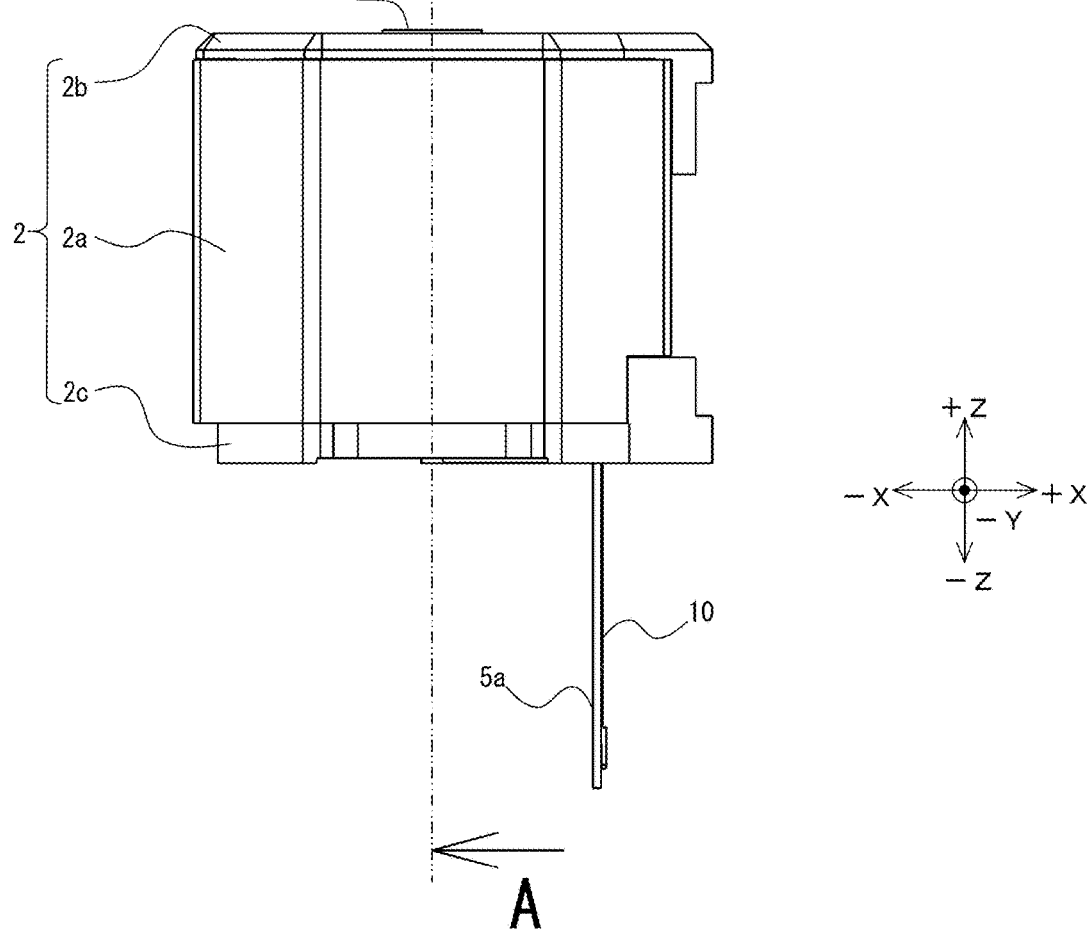
FIG. 2B is a side view of a laser pointer with a shake correction mechanism according to an embodiment.
Figure 3:
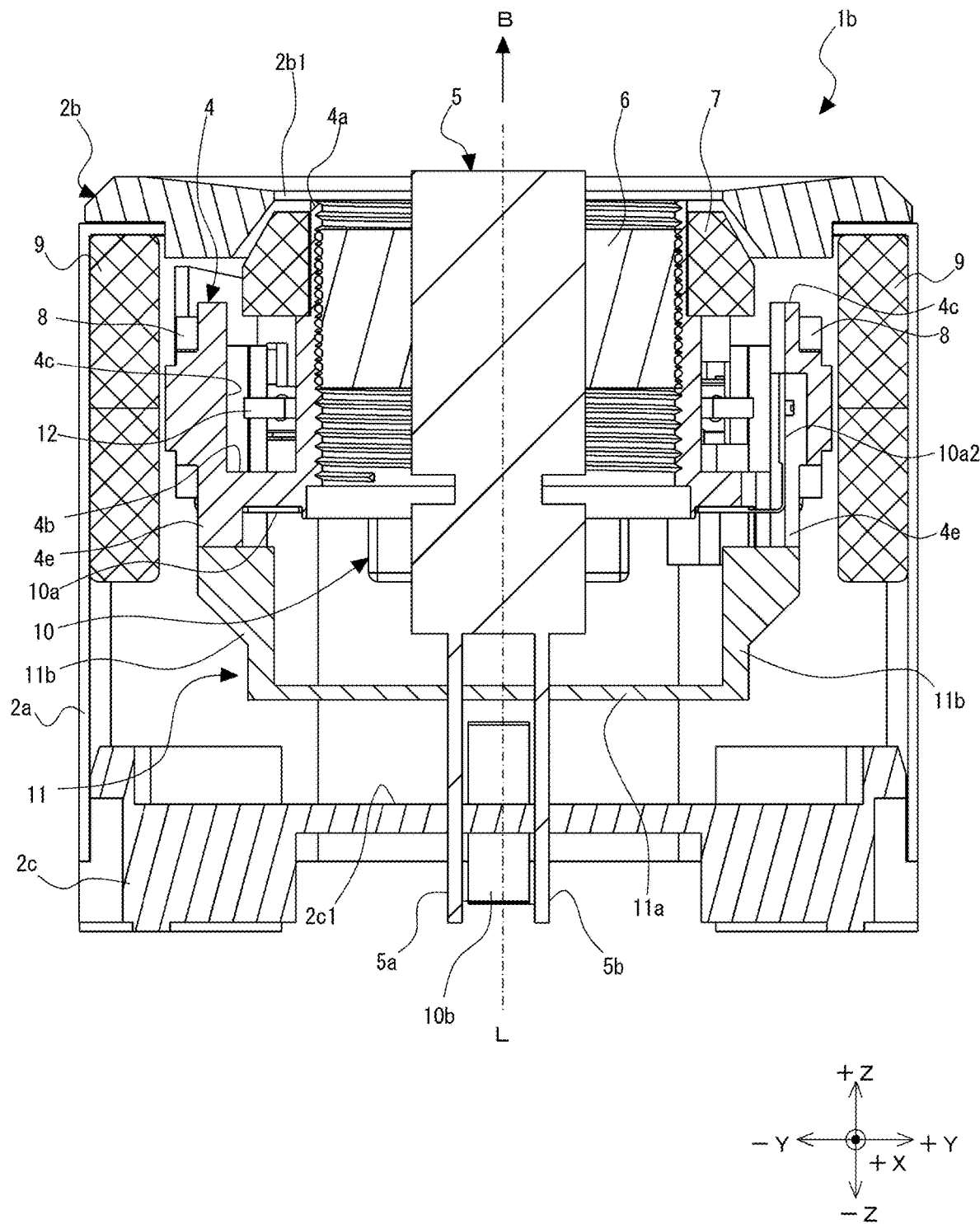
FIG. 3 is a cross-sectional view of a laser pointer with a shake correction mechanism according to an embodiment.
Figure 4:
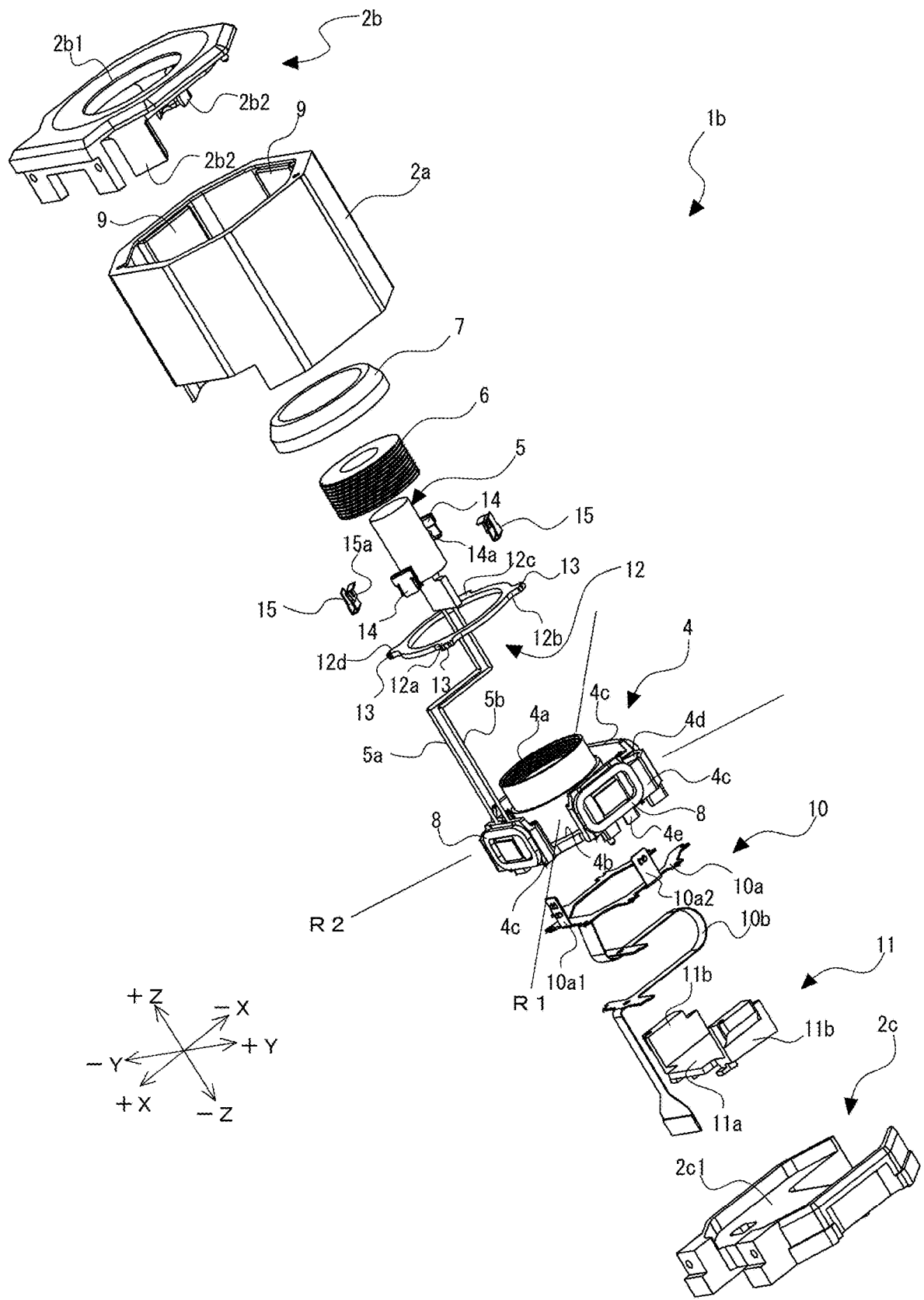
FIG. 4 is an exploded perspective view of a laser pointer with a shake correction mechanism according to an embodiment seen from one direction.
Figure 5:
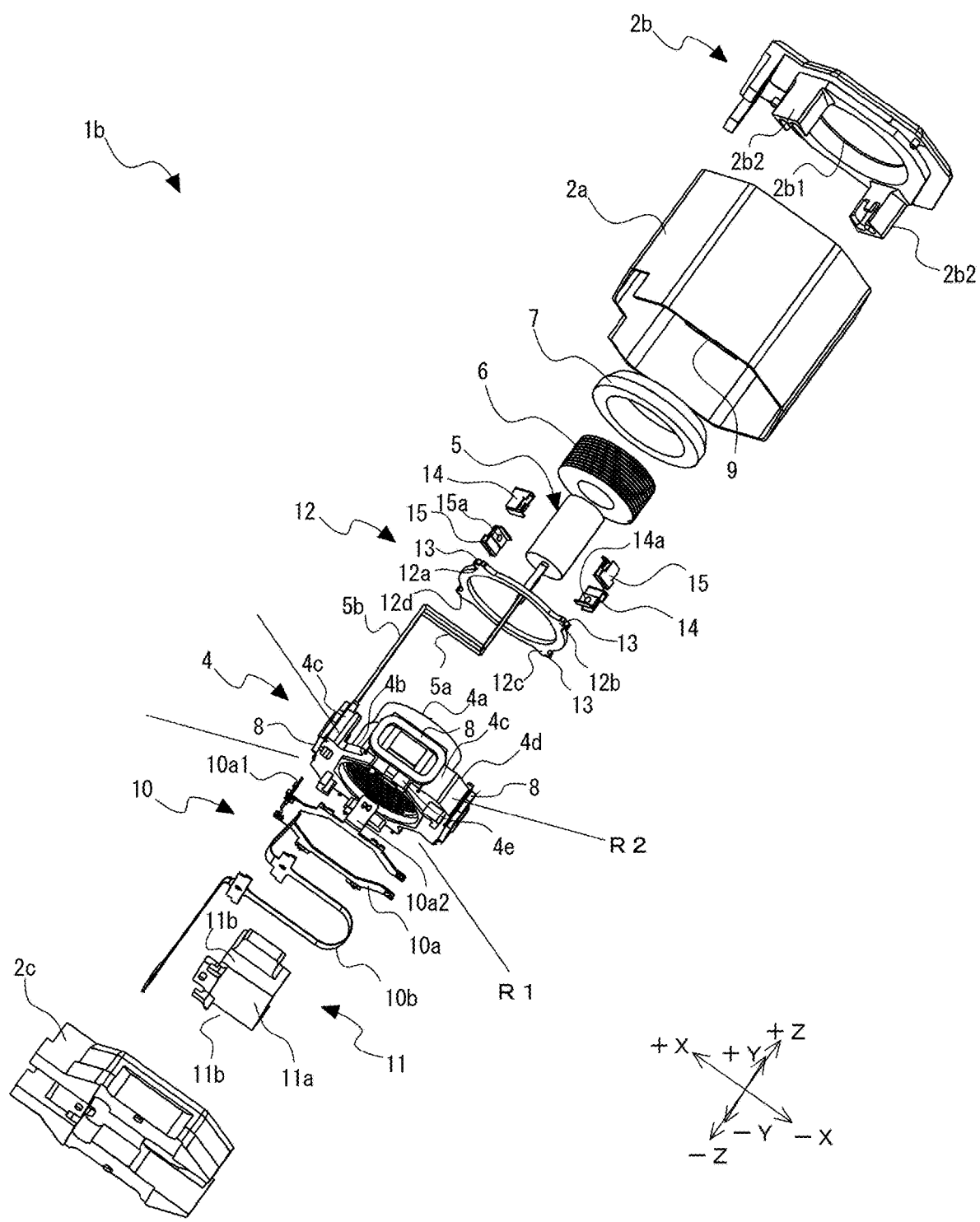
FIG. 5 is an exploded perspective view of a laser pointer with a shake correction mechanism according to an embodiment seen from another direction.

FIG. 1 is an external perspective view, FIG. 2A is a front view, FIG. 2B is a side view, and FIG. 3 is a cross-sectional view taken along line A-A in FIG. 2B seen from an arrow direction, of a laser pointer 1 with a shake correction mechanism according to an embodiment of the present invention. FIG. 4 is an exploded perspective view of the laser pointer 1 seen from a side from which a laser beam is emitted, and FIG. 5 is an exploded perspective view of the laser pointer 1 seen from a side from which the laser beam is emitted.

In the present specification, the same or corresponding parts will be denoted by the same reference numerals. Three axes, i.e., XYZ, illustrated in each drawing are in directions orthogonal to each other, with one side in the X axis direction being indicated by +X and the other side being indicated by −X, one side in the Y axis direction being indicated by +Y and the other side being indicated by −Y, and one side in the Z axis direction being indicated by +Z and the other side being indicated by −Z. The Z axis direction is in a direction of an optical axis L of a laser beam emitted by the laser module 5 accommodated in the movable member 3 of the laser pointer 1 in a state in which the movable member 3 is not vibrating. The +Z direction is a to-be-irradiated side in the optical axis L direction, and the −Z direction is an irradiated side in the optical axis L direction.

In the laser pointer 1, a housing 1a accommodates a shake correction actuator 1b. The shake correction actuator 1b includes a fixed member 2 formed by a tubular casing 2a, a front casing 2b, and a rear casing 2c. The tubular casing 2a is substantially octagonal in outer shape and is made of a magnetic material. The front casing 2b is assembled to the tubular casing 2a from the +Z direction (the to-be-irradiated side), and the rear casing 2c is assembled to the tubular casing 2a from the −Z direction (the irradiated side). The front casing 2b and the rear casing 2c are made of a resin material.

The movable member 3 is disposed inside the fixed member 2 and is supported by a annular movable frame 12 in a later-described manner. The movable member 3 is illustrated in an external perspective view of FIG. 6A a spacer 11 attached to the −Z direction of a holder 4 removed therefrom. The holder 4 is made of resin, and a hollow cylindrical portion 4a is provided to stand upright at the center of a substantially rectangular bottom plate portion 4b. A laser module 5 is accommodated, via an attachment adjusting member 6, in an inner periphery of a cylindrical portion 4a formed at the center portion of the holder 4. In the present embodiment, the attachment adjusting member 6 is made of metal. The cylindrical portion 4a constitutes a housing portion disposed to face the window 2b1 formed in the front casing 2b present on one side of the fixed member 2. The laser module 5 is cylindrical in shape, and two lead wires 5a and 5b are drawn out from an end on the −Z direction. The laser module 5 constitutes a laser light emitter, and when a predetermined voltage is applied between the lead wires 5a and 5b, the laser module 5 emits a laser beam B from an end on the +Z direction.

Attachment Structure of Laser Light Emitter

Figure 6A:
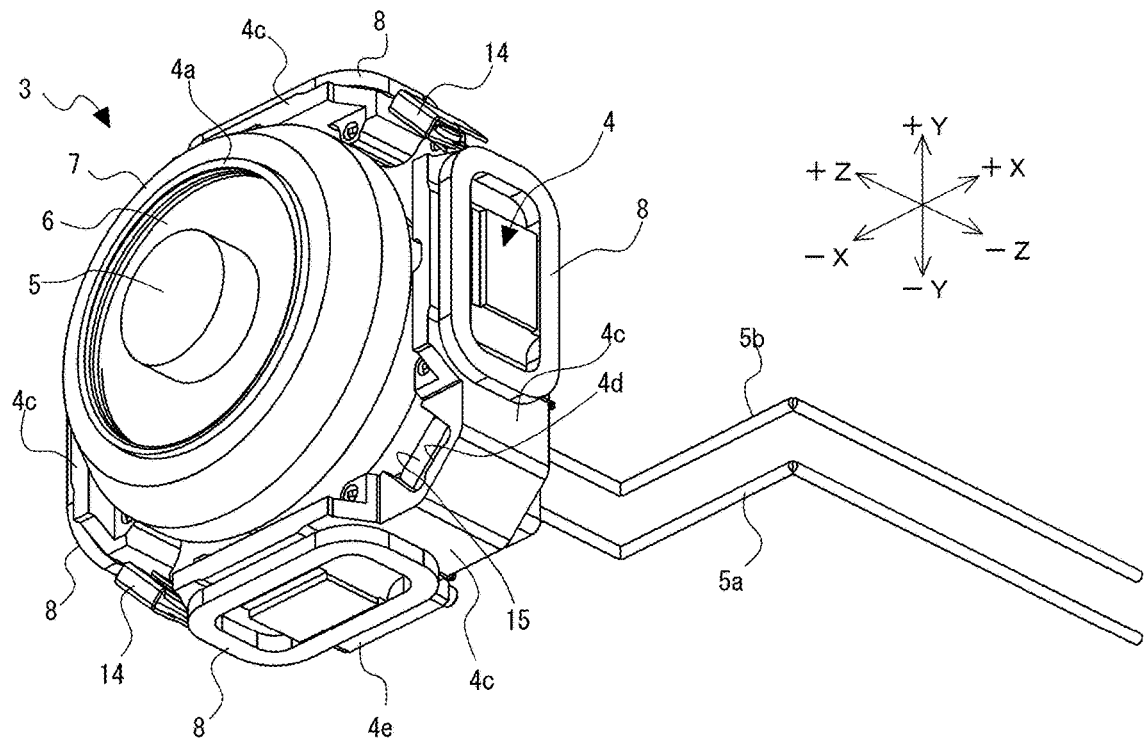
FIG. 6A is a perspective view of a movable member that forms a laser pointer with a shake correction mechanism according to an embodiment.
Figure 6B:
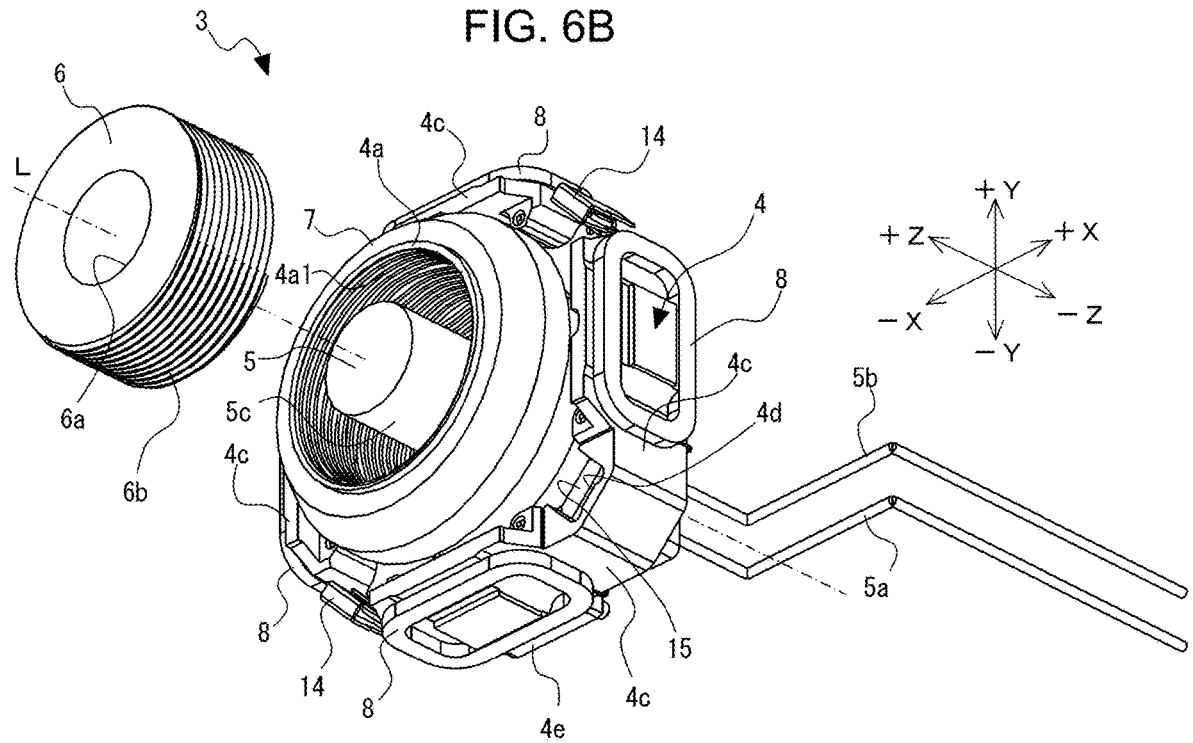
FIG. 6B is a perspective view of a movable member illustrated in FIG. 6A an attachment adjusting member removed therefrom.

FIG. 6B is a perspective view of the movable member 3 illustrated in FIG. 6A the attachment adjusting member 6 removed therefrom. As illustrated in FIG. 6B, the attachment adjusting member 6 has a cylindrical shape with a hollow portion. A diameter of an inner periphery 6a of the hollow portion is determined such that an outer periphery 5c of the laser module 5 fits therein, and a diameter of an outer periphery 6b is determined to fit into the inner periphery 4a1 of the cylindrical portion 4a.

In the present embodiment, the inner periphery 6a of the attachment adjusting member 6 and the outer periphery 5c of the laser module 5 are fixed with an adhesive, and the attachment adjusting member 6 and the laser module 5 are integrally fixed. The outer periphery 6b of the attachment adjusting member 6 has an external thread and the inner periphery 4a1 of the cylindrical portion 4a surrounding the outer periphery 6b of the attachment adjusting member 6 has an internal thread. The attachment adjusting member 6 is attached to the movable member 3 together with the laser module 5 with the external thread screwed into the female thread of the inner periphery 4a1 of the cylindrical portion 4a. The external thread provided on the outer periphery 6b of the attachment adjusting member 6 and the internal thread provided on the inner periphery 4a1 of the cylindrical portion 4a form a first movement mechanism that changes a position at which the attachment adjusting member 6 is attached in the optical axis L direction formed on the outer periphery 6b of the attachment adjusting member 6 and the inner periphery 4a1 of the cylindrical portion 4a surrounding the attachment adjusting member 6.

The central axis of the cylindrical portion 4a coincides with the optical axis L of the laser beam B emitted by the laser module 5 held by the cylindrical portion 4a by the attachment adjusting member 6. The attachment adjusting member 6, which covers the side periphery of the laser module 5 and is accommodated in the cylindrical portion 4a together with the laser module 5, causes the laser beam B to be emitted by the laser module 5 in the optical axis L direction through an window 2b1. A weight 7 for adjusting the position of the center of gravity of the movable member 3 in the optical axis L direction is fixed with an adhesive to an end portion of the cylindrical portion 4a on the +Z direction.

Movable Member Driving Mechanism

At four positions on the holder 4, wall portions 4c are provided to stand in the +Z direction on both sides in the X axis direction and in the Y axis direction of the bottom plate portion 4b. A vibration driving coil 8 is attached to an outer periphery of each of the four wall portions 4c. A vibration driving magnet 9 is attached to each of both inner walls of the tubular casing 2a in the X axis direction and each of both inner walls in the Y axis direction so as to face each of the vibration driving coils 8. The movable member 3 is further provided with, as a vibration detection sensor, a gyroscope, a Hall sensor, etc. (not illustrated) that detects an amount of a vibration transmitted to the fixed member 2 via the housing 1a. The vibration driving coils 8 and the vibration driving magnets 9 constitute a movable member driving mechanism that is provided on the outer periphery of the movable member 3 in the two directions (the X axis direction and the Y axis direction and the inner periphery of the fixed member 2 opposed to the outer periphery, drives the movable member 3 about two directions (along a first axis R1 and a second axis R2 which will be described later), thereby offsetting the amount of vibration detected by a gyroscope or the like.

In the present embodiment, the vibration driving magnets 9 on the inner surface side on the side of the vibration driving coils 8 and the vibration driving magnets 9 on the opposite, outer surface side are differently magnetized. Each of the vibration driving magnets 9 is divided into two in the optical axis L direction, and the +Z direction and the −Z direction on the inner side located on the side of the vibration driving coil 8 are differently magnetized. Therefore, due to an action of the magnetic field exerted by the vibration driving magnets 9 on the vibration driving coils 8, force in the same direction according to the Fleming's left-hand rule acts on the current flowing through each long side of the vibration driving coil 8, and force in the opposite direction is applied to the current flowing in each short side of the vibration driving coil 8 to offset the force. Therefore, each long side of the vibration driving coil 8 is used as an effective side for applying vibration torque to the movable member 3 to perform a shake correction.

In the movable member driving mechanism, the vibration driving coils 8 may be provided on the side of the tubular casing 2a and the vibration driving magnets 9 may be provided on the side of the holder 4. Further, the gyroscope may be provided not in the fixed member 2 but in the fixed member 2 or the housing 1a. An amount of vibration on the fixed member 2 or the housing 1a may be detected by using the gyroscope, and the amount of vibration of the movable member 3 may be detected by using the Hall element mounted on the movable member 3.

A rectangular frame portion 10a of a flexible circuit board 10 is provided in contact with a bottom surface of the bottom plate portion 4b of the holder 4 on the −Z direction along a bottom surface outer edge of the bottom plate portion 4b. A belt-shaped routing portion 10b is drawn out from the rectangular frame portion 10a. A Hall element that detects an amount of vibration about the Y axis and a thermistor that detects an amount of change in temperature are connected to a first stand portion 10a1 protruding in the +Z direction on the rectangular frame portion 10a, (see FIG. 4 and FIG. 5). A Hall element that detects an amount of vibration about the X axis is connected to a second stand portion 10a2 protruding in the +Z direction on the rectangular frame portion 10a (see FIG. 4 and FIG. 5). The routing portion 10b is bent into a U shape along the upper surface and the lower surface of the bottom plate 11a of the spacer 11 and drawn out from a rear casing 2c on the −Z direction together with the lead wires 5a and 5b of the laser module 5, and is connected to an unillustrated control board. A driving current is supplied from the control board to the four vibration driving coils 8 via the flexible circuit board 10 and the movable member 3 is driven in two directions, i.e., about a first axis R1 and a second axis R2 (described later), so as to offset vibrations detected by using a gyroscope or the like. A laser oscillation control signal is output from the control board to the laser module 5 via the lead wires 5a and 5b in accordance with an operation of a power switch 23 described later.

Movable Member Support Mechanism

A gimbal mechanism that supports the movable member 3 with respect to the fixed member 2 in a vibratable manner is formed as a movable member support mechanism between the fixed member 2 and the movable member 3 about two directions, i.e., the first axis R1 and the second axis R2, that intersect in the optical axis L direction of the laser beam B emitted by the laser module 5 (see FIG. 4 and FIG. 5). The first axis R1 is orthogonal to the Z axis direction which is the optical axis L direction of the laser beam emitted by the laser module 5 and the second axis R2 is orthogonal to both the Z axis direction and the first axis R1. In addition, the first axis R1 is inclined with respect to the X axis direction by 45 degrees and the second axis R2 is inclined with respect to the Y axis direction by 45 degrees. The movable member driving mechanism and the movable member support mechanism form a shake correction mechanism 17 (see FIG. 7A) that changes the direction of the laser beam B emitted by the laser module 5 into a direction to offset the shake detected by a gyroscope, etc.). A behavior of the shake correction mechanism 17 is controlled by a later-described controller 22.

The movable member support mechanism includes an annular movable frame 12 that surrounds an outer periphery of the movable member 3. The movable frame 12 is disposed between the movable member support mechanism and the fixed member 2. In the present embodiment, the movable frame 12 surrounds the outer periphery on the cylindrical portion 4a at the same position with that of the center of gravity of the movable member 3 in the optical axis L direction and on the slightly −Z direction as illustrated in FIG. 3. The center of gravity position and the swing support center position of the movable member 3 by the movable member support mechanism are arranged to coincide in the optical axis L direction. The movable frame 12 includes a first corner portion 12a, a second corner portion 12b, a third corner portion 12c, and a fourth corner portion 12d about the optical axis L (see FIG. 4 and FIG. 5). The first corner portion 12a and the third corner portion 12c are separated in a direction of the first axis R1. The second corner portion 12b and the fourth corner portion 12d are separated in a direction of the second axis R2. The first corner portion 12a and the third corner portion 12c of the movable frame 12 are supported on the fixed member 2 in the vibratable manner with two fixed member-side vibration support portions described below, and the second corner portion 12b and the fourth corner portion 12d of the movable frame 12 support the movable member 3 with two movable member-side vibration support portions described below.

The fixed member-side vibration support portion is formed by a protrusion provided at one of the movable frame 12 and the fixed member 2, and a recess that receives a tip of the protrusion provided on a the other side of the movable frame 12 and the fixed member 2 at a portion between the first corner portion 12a of the movable frame 12 and the fixed member 2 and a portion between the third corner portion 12c of the movable frame 12 and the fixed member 2. In the present embodiment, the protrusions are formed by metallic spherical bodies 13 welded to the first corner portion 12a and the third corner portion 12c of the movable frame 12. In the pair of plate springs 14 that are separated in the direction of the first axis R1, hemispherical recesses 14a are formed on opposing surfaces, and the recesses 14a form the recess described above. Surrounded portions opposed to each other are formed in support plate portions 2b2 separated in the first axis R1 direction and projecting in the −Z direction from the rear surface of the front casing 2b. The plate springs 14 are fit into and attached to these surrounded portions. An end side of the spherical body 13 protruding outward in the circumferential direction of the movable frame 12 at the first corner portion 12a and the third corner portion 12c is received in each recess 14a of the plate spring 14.

The movable member-side vibration support portion is formed by a protrusion provided at one of the movable frame 12 and the movable member 3 and a recess that receives a tip of the protrusion provided on the other side of the movable frame 12 and the movable member 3 at a portion between the second corner portion 12b of the movable frame 12 and the movable member 3 and a portion between the fourth corner portion 12d of the movable frame 12 and the movable member 3. In the present embodiment, the protrusions are formed by metallic spherical bodies 13 welded to the second corner portion 12b and the fourth corner portion 12d of the movable frame 12. In the pair of plate springs 15 that are separated in the direction of the second axis R2, hemispherical recesses 15a are formed on opposing surfaces, and the recesses 15a form the recess described above. Insertion portions 4d are formed spaced apart in the second axis R2 direction via the cylindrical portion 4a and surrounded three sides with a pair of wall portions 4c and the bottom plate portion 4b adjacent to the holder 4. The plate springs 15 are fit into and attached to these insertion portions 4d (See FIG. 4 and FIG. 6A-FIG. 6B). An end side of the spherical body 13 protruding outward in the circumferential direction of the movable frame 12 at the second corner portion 12b and the fourth corner portion 12d is received in each recess 15a of the plate spring 15.

Therefore, in the movable frame 12, the first corner portion 12a and the third corner portion 12c separated from each other in the first axis R1 direction are supported to be vibratable about the first axis R1 with respect to the fixed member 2, and the second corner portion 12b and the fourth corner portion 12d separated from each other in the second axis R2 direction support the movable member 3 to be vibratable about the second axis R2. The movable member 3 is supported to be vibratable about the first axis R1 with the fixed member-side vibration support portion formed by the protrusion and the recess at a portion between the first corner portion 12a of the movable frame 12 and the fixed member 2 and a portion between the third corner portion 12c of the movable frame 12 and the fixed member 2. The movable member 3 is supported to be vibratable about the second axis R2 with the movable member-side vibration support portion formed by the protrusion and the recess at a portion between the second corner portion 12b and the movable member 3 and a portion between the fourth corner portion 12d and the movable member 3. Therefore, the movable member 3 is supported to be vibratable about the first axis R1 and the second axis R2 relative to the fixed member 2 via the movable frame 12.

The pair of plate springs 14 attached to the support plate portions 2b2 of the front casing 2b are elastically deformable in the first axis R1 direction and the pair of plate springs 15 attached to the insertion portions 4d of the holder 4 are elastically deformable in the second axis R2 direction. A pair of opposed leg portions 11b (see FIG. 4 and FIG. 5) is formed to be disposed on the +Z direction at both ends of the bottom plate 11a of the spacer 11 in the Y axis direction. As illustrated in FIG. 3, an upper end of each of the leg portions 11b is in contact with and fixed to a protrusion 4e protruding toward the −Z direction from the bottom surface of the bottom plate portion 4b of the holder 4.

Configuration of Controller

Figure 7A:
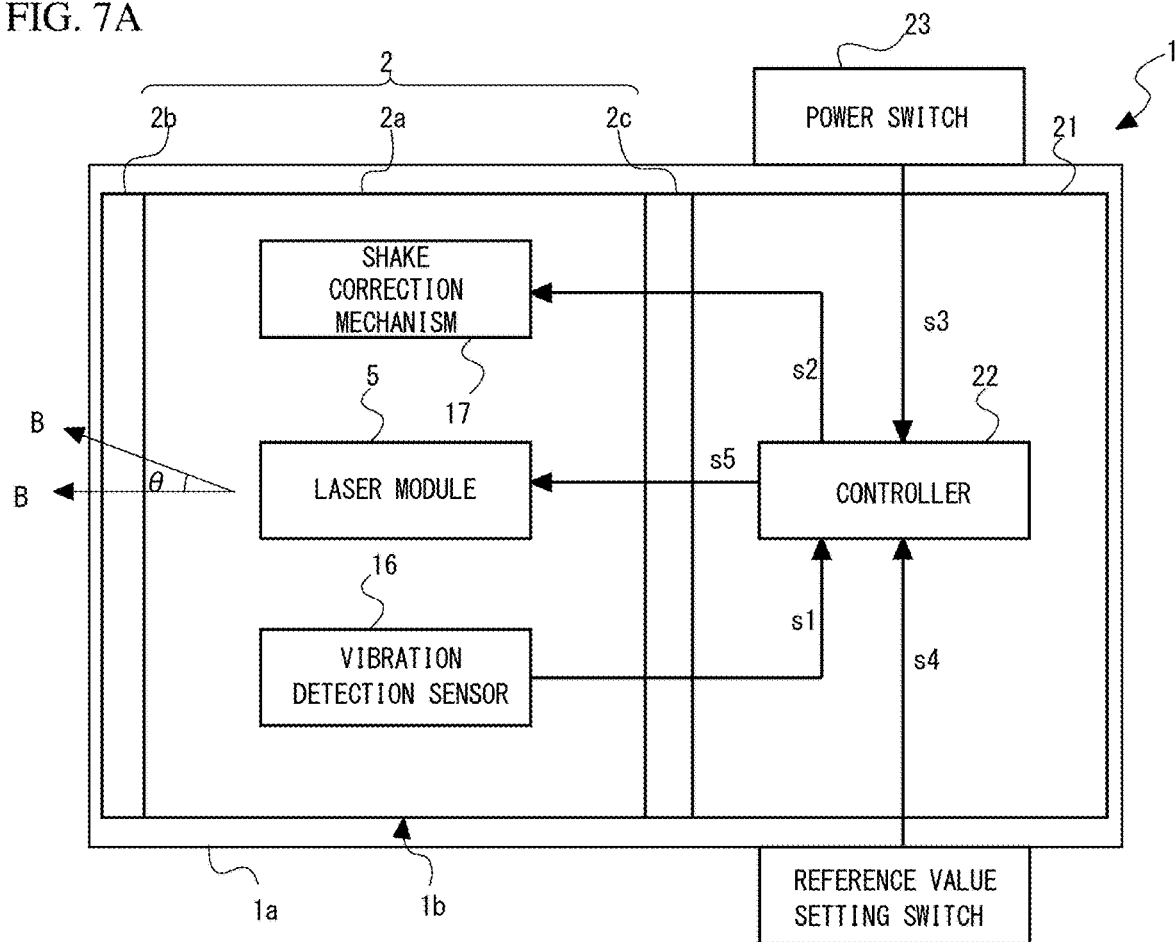
FIG. 7A is a block diagram schematically illustrating an entire configuration of a laser pointer with a shake correction mechanism according to an embodiment.

FIG. 7A is a block diagram schematically illustrating an entire configuration of the laser pointer 1.

Inside the fixed member 2, a laser module 5, a vibration detection sensor 16, and a shake correction mechanism 17 including the movable member driving mechanism and the movable member support mechanism described above are accommodated. A second fixed member 21 is attached to the rear casing 2c of the fixed member 2 from the −Z direction. The routing portion 10b of the flexible circuit board 10 and the lead wires 5a and 5b of the laser module 5 are pulled out from the side of the rear casing 2c of the fixed member 2 and drawn into the second fixed member 21, and is connected to the aforementioned control board built in the second fixed member 21. The controller 22 is configured as an electronic circuit on this control board. The vibration signal s1 detected by the vibration detection sensor 16 is input into the controller 22, and upon input of the vibration signal s1, the controller 22 outputs a control signal s2 to the shake correction mechanism 17. In accordance with the control signal s2, the shake correction mechanism 17 changes the direction of the laser beam B emitted by the laser module 5 into a direction to offset the shake detected by the vibration detection sensor 16. The second fixed member 1a does not necessarily have to be provided, in which case the control board may be directly provided in the housing 21.

The power switch 23 and a reference value setting switch 24 to be operated by a user of the laser pointer 1 are provided on an outer surface of the housing 1a. The power switch 23 outputs a switch signal s3 to the controller 22 and the reference value setting switch 24 outputs a set value signal s4 to the controller 22. When the switch signal s3 output from the power switch 23 is an ON operation signal, an operation power is supplied to the controller 22, and the controller 22 outputs an operation signal s5 to the laser module 5. Upon reception of the operation signal s5, the laser module 5 emits a laser beam B. Further, when the switch signal s3 is an OFF operation signal, supply of the operating power to the controller 22 is stopped. In this case, the operation signal s5 output to the laser module 5 is stopped and the laser module 5 stops the emission of the laser beam B. In accordance with the set value signal s4 input from the reference value setting switch 24, the controller 22 sets a reference frequency value f0 of a frequency f of the vibration used in a frequency comparison unit 41, which will be described below, and a reference movement amount value m0 of a shake movement amount m used in a movement amount comparison unit 42 which will be described below.

Figure 7B:
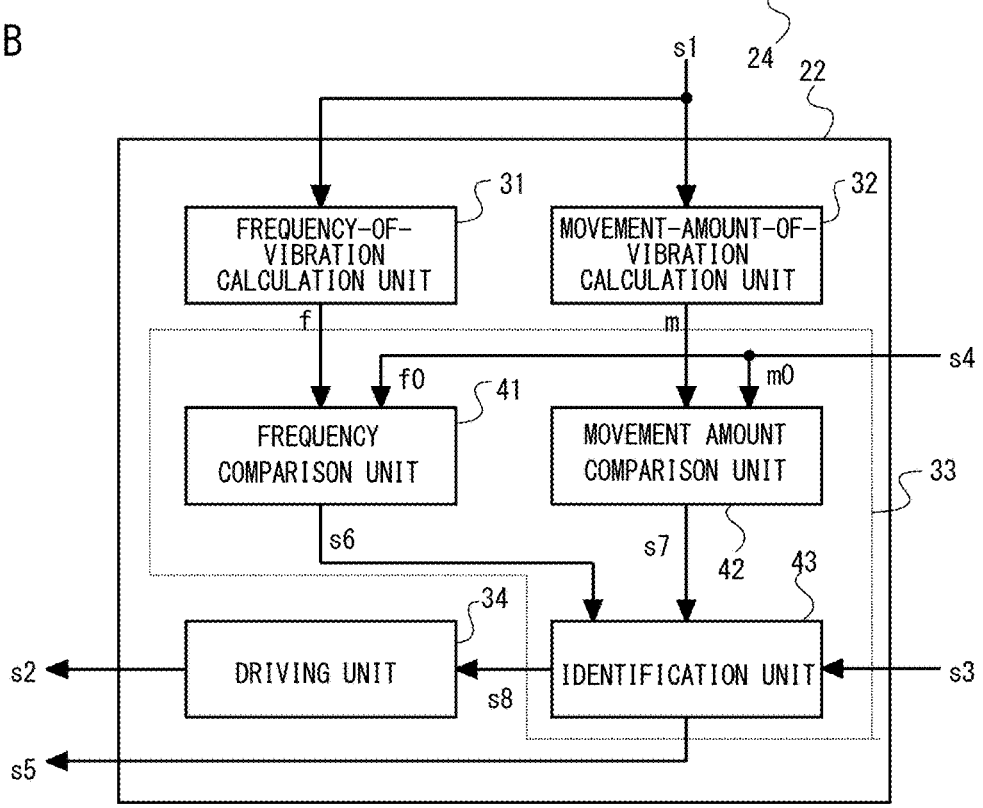
FIG. 7B is a block configuration diagram illustrating a configuration of a controller illustrated in FIG. 7A.

FIG. 7B is a block diagram illustrating an internal configuration of the controller 22.

The controller 22 includes a frequency-of-vibration calculation unit 31, a movement-amount-of-vibration calculation unit 32, a hand-shake determination unit 33, and a shake correction mechanism driving unit 34. In the present embodiment, the hand-shake determination unit 33 includes a frequency comparison unit 41, a movement amount comparison unit 42, and an identification unit 43. Each of these units is constituted by software arithmetic processing of a microcomputer mounted on the control board, constituted by hardware of an electronic circuit, or a combination of software and hardware.

The vibration signal s1 detected by the vibration detection sensor 16 is input into the shake frequency calculation unit 31 and the movement-amount-of-vibration calculation unit 32. The frequency-of-vibration calculation unit 31 calculates, based on the vibration signal s1, the frequency f of the vibration detected by the vibration detection sensor 16. The movement-amount-of-vibration calculation unit 32 calculates, based on the vibration signal s1, a movement amount m of a vibration detected by the vibration detection sensor 16. The movement amount m of the vibration affects an inclination θ of the laser beam B emitted by the laser module 5 (see FIG. 7A). When the movement amount m of the vibration is small, the inclination θ of the laser beam B is also small and, when the movement amount m of the vibration is large, the inclination θ of the laser beam B is also large.

Based on the frequency f of the vibration calculated by the frequency-of-vibration calculation unit 31 and the movement amount m of the vibration calculated by the movement-amount-of-vibration calculation unit 32, the hand-shake determination unit 33 determines a vibration applied to the fixed member 2 via the housing 1a caused by a hand-shake. In the present embodiment, this determination is performed by comparing the frequency f of the vibration calculated by the frequency-of-vibration calculation unit 31 with the reference frequency f0 by the frequency comparison unit 41, and by comparing the movement amount m of the vibration calculated by the movement-amount-of-vibration calculation unit 32 with the reference movement amount m0 by the movement amount comparison unit 42. The comparison result of the frequency f of the vibration is output as a comparison result signal s6 from the frequency comparison unit 41 to the identification unit 43, and the comparison result of the movement amount m of the vibration is output as a comparison result signal s7 from the movement amount comparison unit 42 to the identification unit 43.

When the frequency f of the vibration calculated by the frequency-of-vibration calculation unit 31 is higher than the reference frequency f0 and the movement amount m of the vibration calculated by the movement-amount-of-vibration calculation unit 32 is smaller than the reference movement amount m0, the identification unit 43 determines that the vibration detected by the vibration detection sensor 16 is a vibration caused by a hand-shake, and outputs a control signal s8 to the shake correction mechanism driving unit 34. That is, in the present embodiment, the vibration applied to the fixed member 2 due to the trembling produced in the user's hand holding the laser pointer 1 is regarded to have the frequency f higher than the reference frequency f0 and the movement amount m smaller than the reference movement amount m0, and a shake correction is performed in order to exclude a vibration having such a frequency f and a movement amount m. When the control signal s8 is input, the shake correction mechanism driving unit 34 outputs the driving current as the control signal s2 to each of the vibration driving coils 8 so that the movable member 3 moves about the X axis and the Y axis by a displacement angle θx about the X axis and a displacement angle θy about the Y axis indicated by the control signal s8 and cause the movable member 3 to swing about the first axis R1 and about the second axis R2.

The switch signal s3 output from the power switch 23 is supplied to the identification unit 43, and the identification unit 43 outputs the control signal s5 to the laser module 5 when the switch signal s3 is an ON operation signal. When the switch signal s3 is an OFF operation signal, the output of the control signal s5 to the laser module 5 is stopped.

Method for Suppressing and Controlling Vibration

Figure 8:
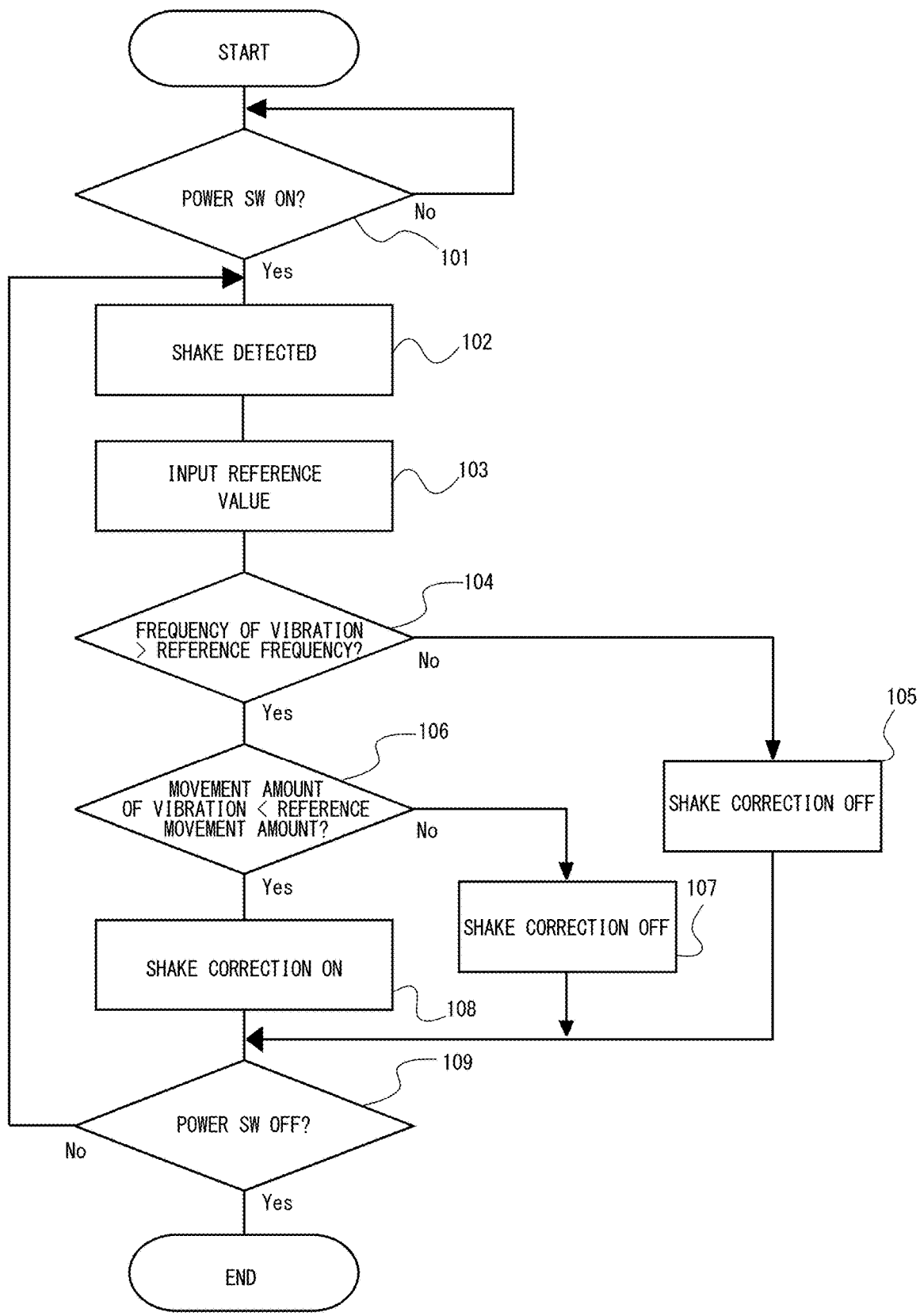
FIG. 8 is a flow diagram illustrating a method for suppressing and controlling a vibration of a laser pointer with a shake correction mechanism according to an embodiment of the present invention.

FIG. 8 is a flowchart illustrating a method for suppressing and controlling a vibration of the laser pointer 1 performed by the controller 22.

The controller 22 monitors the power switch 23 and determines whether the power switch 23 has been turned on (see step 101 in FIG. 8). When the power switch 23 is turned on and the determination result in step 101 is Yes, the vibration signal s1 output from the vibration detection sensor 16 is input into the controller 22, and the controller 22 detects a vibration produced in the fixed member 2 accommodating a laser module 5 that emits the laser beam B (see step 102). Then, the frequency-of-vibration calculation unit 31 calculates the frequency f of the vibration to be detected by the vibration detection sensor 16, and the movement-amount-of-vibration calculation unit 32 calculates the movement amount m of the vibration to be detected by the vibration detection sensor 16. Next, the controller 22 reads the reference frequency f0 of the frequency f of the vibration and the reference movement amount m0 of the movement amount m of the vibration which are set by the reference value setting switch 24 as reference values (see step 103).

Next, the controller 22 compares the frequency f of the vibration calculated by the frequency-of-vibration calculation unit 31 with the reference frequency f0 by the frequency comparison unit 41, and determines whether the frequency f of the vibration is greater than the reference frequency f0 (See step 104). When the frequency f of the vibration is smaller than the reference frequency f0 and therefore the determination result in step 104 is No, the angular velocity of the vibration to be detected by the vibration detection sensor 16 is small. In this case, the controller 22 determines that the direction of the laser beam B is intentionally and slowly changed by the user of the laser pointer 1, and that a light spot formed on an object has intentionally been moved slowly. Then, the controller 22 does not cause the shake correction mechanism 17 to perform the shake correction and turns the shake correction off (see step 105).

When the frequency f of the vibration is greater than the reference frequency f0 and the determination result of step 104 is Yes, then the angular velocity of the vibration detected by the vibration detection sensor 16 is large, and the user's fingertip may be trembling against the intension of the user. In this case, the controller 22 next compares the movement amount m of the vibration calculated by the movement-amount-of-vibration calculation unit 32 with the reference movement amount m0 by the movement amount comparison unit 42, and determines whether the movement amount m of the vibration is smaller than the reference movement amount m0 (see step 106). When the movement amount m of the vibration is larger than the reference movement amount m0 and the determination result of step 106 is No, the controller 22 determines that the direction of the laser beam B is intentionally and significantly changed by the user of the laser pointer 1, and that the light spot formed on the object has intentionally been moved significantly. In this case, the controller 22 does not cause the shake correction mechanism 17 to perform the shake correction and turns the shake correction off (see step 107).

When the movement amount m of the vibration is smaller than the reference movement amount m0 and the determination result of step 106 is Yes, the controller 22 determines that the fingertip of the user is trembling quickly and finely against the intention of user, and that the vibration detected by the vibration detection sensor 16 is a vibration caused by a hand-shake. In this case, the controller 22 turns the shake correction on and causes the shake correction mechanism 17 to perform the shake correction (see step 108). Therefore, the direction of the laser beam B emitted by the laser module 5 is controlled to a direction such that the vibration detected by the vibration detection sensor 16 is offset.

After performing the processing of step 105, step 107, or step 108, the controller 22 next determines whether the power switch 23 has been turned off (see step 109). When the power switch 23 is not turned off and the determination result of step 109 is No, the process returns to step 102 and the controller 22 repeats the above-described process. When the power switch 23 is turned off and the determination result of step 109 is Yes, the controller 22 terminates the vibration suppressing control process.

Operation and Effects

With the laser pointer 1 with a shake correction mechanism and the method for suppressing and controlling a vibration according to at least an embodiment of the present embodiment as described above, the vibration produced, via the housing 1a, in the fixed member 2 accommodating the laser module 5 detected by the vibration detection sensor 16 is determined whether to be caused by a hand-shake based on the frequency f of the vibration and the movement amount m of the vibration as described above. When it is determined that the vibration is caused by a hand-shake, the shake correction mechanism 17 is activated and the hand-shake correction is performed. Therefore, the hand-shake determination unit 33 determines whether the vibration produced in the fixed member 2 accommodating the laser module 5 is caused by a hand-shake by referring to the movement amount m of the vibration in addition to the frequency f of the vibration (see FIG. 7B). Therefore, even when it is determined in the process of step 104 of FIG. 8 that the vibration of the specific frequency f of the vibration is being produced in the fixed member 2, it is determined in the process of step 106 that vibrations with the large movement amount m of the vibration are caused by an intentional change in a pointing point, and that vibrations with a small movement amount m of the vibration are caused by trembling of the hand of the person holding the laser pointer 1. Therefore, vibrations caused by a hand-shake can be appropriately removed.

With the laser pointer 1 with a shake correction mechanism and a method for suppressing and controlling a vibration according to at least an embodiment of the present invention, when the comparison result is that the frequency f of the vibration produced in the fixed member 2 accommodating the laser module 5 detected by the vibration detection sensor 16 is higher than the reference frequency f0 and the movement amount m of the vibration is smaller than the reference movement amount m0, the hand-shake determination unit 33 determines that the vibration detected by the vibration detection sensor 16 is caused by a hand-shake. Therefore, a simple comparison between the frequency f of the vibration and the reference frequency can determine whether the frequency f of the vibration is high or low, and a simple comparison between the movement amount m of the vibration with the reference movement amount can determine whether the movement amount of the vibration is large or small. Therefore, the hand-shake determination unit 33 of the laser pointer 1 with a shake correction mechanism is simplified in structure as compared with related art laser pointers using a filter. A determination step including steps 104 and 106 in the method for suppressing and controlling a vibration of the laser pointer 1 can be executed simply and promptly.

The laser pointer 1 with a shake correction mechanism according to the present embodiment includes, as a reference value setting unit, the reference value setting switch 24 that sets the value of the reference frequency f0 and the value of the reference movement amount m0 to arbitrary values. With the method for suppressing and controlling a vibration of the laser pointer 1 with a shake correction mechanism according to the present embodiment, a reference value input step in which the value of the reference frequency f0 and the value of the reference movement amount m0 to be set to the reference value setting switch 24 is input is provided as step 103 before the comparison step that includes steps 104 and 106. Therefore, according to the present embodiment, the reference values for determining high or low of the frequency f of the vibration and large or small of the movement amount m of the vibration are appropriately adjusted in accordance with the personality of a person holding the laser pointer 1. Therefore, it is possible to provide the laser pointer 1 with a shake correction mechanism in accordance with the personality of a person using the laser pointer 1, and a method for suppressing and controlling vibration of the laser pointer 1.

Modification

In the embodiment described above, in step 104 of FIG. 8, a case in which the frequency f of the vibration calculated by the frequency-of-vibration calculation unit 31 is compared with the reference frequency f0 by the frequency comparison unit 41 and whether the frequency f of the vibration is larger than the reference frequency f0 is determined, then, in step 106, the movement amount m of the vibration calculated by the movement-amount-of-vibration calculation unit 32 is compared with the reference movement amount m0 by the movement amount comparison unit 42, and whether the movement amount m of the vibration is smaller than the reference movement amount m0 is described. Alternatively, the movement amount m of the vibration calculated by the movement-amount-of-vibration calculation unit 32 may be compared with the reference movement amount m0 by the movement amount comparison unit 42 and whether the movement amount m of the vibration is smaller than the reference movement amount m0 may be determined, then, a case in which the frequency f of the vibration calculated by the frequency-of-vibration calculation unit 31 is compared with the reference frequency f0 by the frequency comparison unit 41 and whether the frequency f of the vibration is greater than the reference frequency f0 may be determined. This configuration may produce the same operation and effect as those of the embodiment described above.

INDUSTRIAL APPLICABILITY

The laser pointer with a shake correction mechanism and the method for suppressing and controlling vibration of the laser pointer according to at least an embodiment of the present invention are applicable to a presentation made to an audience by a presenter while pointing a desired portion on an image projected on a screen or the like with a light spot of a laser beam. Even when the trembling generated at the hand of the presenter holding the laser pointer is transferred to the laser pointer, the trembling of the light spot is appropriately suppressed and, therefore, the presenter can concentrate on making the presentation.

Further, the laser pointer with a shake correction mechanism and the method for suppressing and controlling vibration of the laser pointer according to at least an embodiment of the present invention are applicable not only to a laser pointer, but also to a pico projector, a barcode reader or the like having the same configuration as that of a laser pointer. Also in that case, the same operation and effects as those of the embodiment described above are obtained.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A laser pointer comprising a laser light emitter that emits a laser beam, a housing accommodating the laser light emitter; a vibration detection sensor that detects a vibration produced in the housing, a shake correction mechanism that changes a direction of the laser beam emitted by the laser light emitter, and a controller that controls the direction of the laser beam, which is changed by the shake correction mechanism, into a direction so as to offset the vibration detected by the vibration detection sensor, wherein
the controller is configured to:
calculate a frequency of the vibration detected by the vibration detection sensor;
calculate a movement amount of the vibration detected by the vibration detection sensor;

determine whether a vibration applied to the housing is caused by a hand-shake based on the frequency of the vibration and the movement amount of the vibration; and activate the shake correction mechanism in response to a determination that the vibration detected by the vibration detection sensor is caused by a hand-shake, wherein the controller is further configured to:

compare the frequency of the vibration calculated with a reference frequency;

compare a movement amount of the vibration with a reference movement amount; and determine that the vibration detected by the vibration detection sensor is caused by a hand-shake when the frequency of the vibration is higher than the reference frequency and the movement amount of the vibration is smaller than the reference movement amount, and wherein the controller is further configured to set a value of the reference frequency and a value of the reference movement amount to respective values.

2. A method for suppressing and controlling a vibration of a laser pointer with a shake correction mechanism, the method comprising:

detecting, by a vibration detection sensor, a vibration produced in a housing accommodating a laser light emitter that emits a laser beam; and controlling, by a shake correction mechanism, a direction of the laser beam emitted by the laser light emitter into a direction so as to offset the vibration detected in the detection, wherein the controlling comprises calculating a frequency of vibration and a movement amount of a vibration detected by the vibration detection sensor, determining whether the vibration applied to the housing is caused by a shake based on a frequency of a vibration and a movement amount of the vibration calculated in the calculating, and driving to activate the shake correction mechanism in response to a determination that the vibration detected by the vibration detection sensor is caused by a hand-shake, wherein the determining comprises:

comparing a frequency of a vibration calculated in the calculating with a reference frequency and comparing a movement amount of vibration with a reference movement amount; and when a comparison result is that the frequency of the vibration is higher than the reference frequency and that the movement amount of the vibration is smaller than the reference movement amount in the comparing, identifying to determine that the vibration detected by the vibration detection sensor is caused by a hand-shake, and wherein the method further comprises before the comparing, inputting a value of the reference frequency and a value of the reference movement amount to be set to a reference value setting unit.

* * * * *